(12) United States Patent
Wald

(10) Patent No.: US 8,307,916 B1
(45) Date of Patent: Nov. 13, 2012

(54) CONTROLLING FLUID LOSS IN OIL AND GAS WELLS

(76) Inventor: H. Lester Wald, Mustang, OK (US)

( * ) Notice: Subject to any disclaimer, the term of this patent is extended or adjusted under 35 U.S.C. 154(b) by 1102 days.

(21) Appl. No.: 11/679,523

(22) Filed: Feb. 27, 2007

(51) Int. Cl.
*E21B 33/13* (2006.01)

(52) U.S. Cl. .......................................... 175/72; 166/292

(58) Field of Classification Search .................... 175/72; 166/282, 283, 292, 295
See application file for complete search history.

(56) References Cited

U.S. PATENT DOCUMENTS

| | | | |
|---|---|---|---|
| 3,417,821 A * | 12/1968 | Tinsley et al. ................ | 166/283 |
| 3,417,824 A * | 12/1968 | Van Poollen .................. | 166/117 |
| 4,191,254 A * | 3/1980 | Baughman et al. ........... | 166/286 |
| 4,205,611 A * | 6/1980 | Slawinski ..................... | 102/324 |
| 6,655,475 B1 * | 12/2003 | Wald ............................... | 175/64 |
| 6,983,799 B2 * | 1/2006 | Reddy et al. .................. | 166/291 |
| 7,066,285 B2 | 6/2006 | Shaarpour | |
| 7,098,172 B1 * | 8/2006 | Horton et al. ................. | 507/128 |
| 2003/0141062 A1 * | 7/2003 | Cowan et al. ................. | 166/294 |
| 2004/0168804 A1 * | 9/2004 | Reddy et al. .................. | 166/295 |
| 2006/0213662 A1 * | 9/2006 | Creel et al. ................... | 166/286 |

OTHER PUBLICATIONS

AGRO Innovators Inernational, "Agrosoke," Material Safety Data Sheet, Jul. 15, 1992, published by AGRO Innovators International, Arlington TX 76012, USA. (3 pages).
AGRO Inernational, "About Agrosoke" and "How Does Agrosoke Work?" pages from agrosoke.net, Feb. 22, 2007, published by AGRO Innovators International, Arlington TX 76012, USA. (4 pages).

* cited by examiner

*Primary Examiner* — Sean Andrish
(74) *Attorney, Agent, or Firm* — Mary M. Lee

(57) ABSTRACT

A product, system and method for controlling fluid loss in oil wells, including lost circulation while drilling wells. A load of fluid control pods is pumped down the drill string into the target formation using water, drilling mud or another suitable delivery fluid. Each pod comprises a discrete mass of swelling agent with a frictional surface. Preferably, the pod comprises superabsorbent granules inside a fabric sack that is deformable and elastic and provides the frictional surface. After the pods have time to swell and become compressed against each other in the voids, drilling or other procedures may be continued. The size and frictional surface of the pods facilitates stable positioning of the pods in the voids of the formation, minimizes the total amount of swelling agent required, and reduces the tendency of the pods to become dislodged.

32 Claims, 3 Drawing Sheets

CONTROLLING FLUID LOSS IN OIL AND GAS WELLS

FIELD OF THE INVENTION

The present invention relates generally to drilling oil and gas wells and, more particularly, but without limitation, to products and methods for controlling fluid loss in wells.

BACKGROUND OF THE INVENTION

The drilling phase of an oil or gas well consists fundamentally of drilling a hole down into a subterranean formation by means of a bit on the end of the drill string. As the drilling continues, the wellbore is lined or "cased" in sections using tubular casing material. Throughout the drilling operation, drilling fluids or muds are circulated through the well to cool and lubricate the bit and flush the cuttings up from the bottom of the wellbore. The mud is circulated continuously from a pumping unit at the surface down through the inside of the drill string, out through the end of the drill string or bit at the bottom of the well, and then back up the annulus between the inside of the wellbore or casing and the outside of the drill string.

A common problem encountered during drilling is the excessive loss of drilling fluids out into voids in the formation. This fluid loss is often referred to as "lost circulation." "Voids" refers to spaces in the formation, usually not formed by the drill bit, such as fractures, fracture networks, caverns, cracks, fissures, vugs, cavities, washouts, cobble packs, unconsolidated sands, and the like, which may extend from an opening in the wellbore wall deep into the adjacent formation. Lost circulation is costly because the lost drilling mud must be replenished constantly to maintain an adequate volume of fluid in the well. In addition, lost circulation may result in destabilization of permeable formations and damage to the wellbore. "Fluid loss control" and similar expressions used herein refer to efforts to reduce or avoid excessive fluid loss, such as lost circulation.

Various materials and methods have been used to deal with lost circulation. Among the materials that have been used to control lost circulation are shredded automobile tires, nylon rope fibers, sawdust, wood chips, mica flakes, cottonseed hulls, ground nutshells, burlap bags, shredded diapers, and various gels or slurries, such as hydraulic cement. While these materials have met with some success, there remains a need for a lost circulation control technology that is cost effective, easy to use, long-lasting, and environmentally friendly.

BRIEF DESCRIPTION OF THE DRAWINGS

In FIG. 2, the pod is shown in the unexpanded condition; in FIG. 3, the pod of FIG. 2 is shown in the expanded position.

In FIG. 4, the pod is shown in the unexpanded condition; in FIG. 5, the pod of FIG. 4 is shown in the expanded position.

DETAILED DESCRIPTION OF THE PREFERRED EMBODIMENTS

Figure 1:
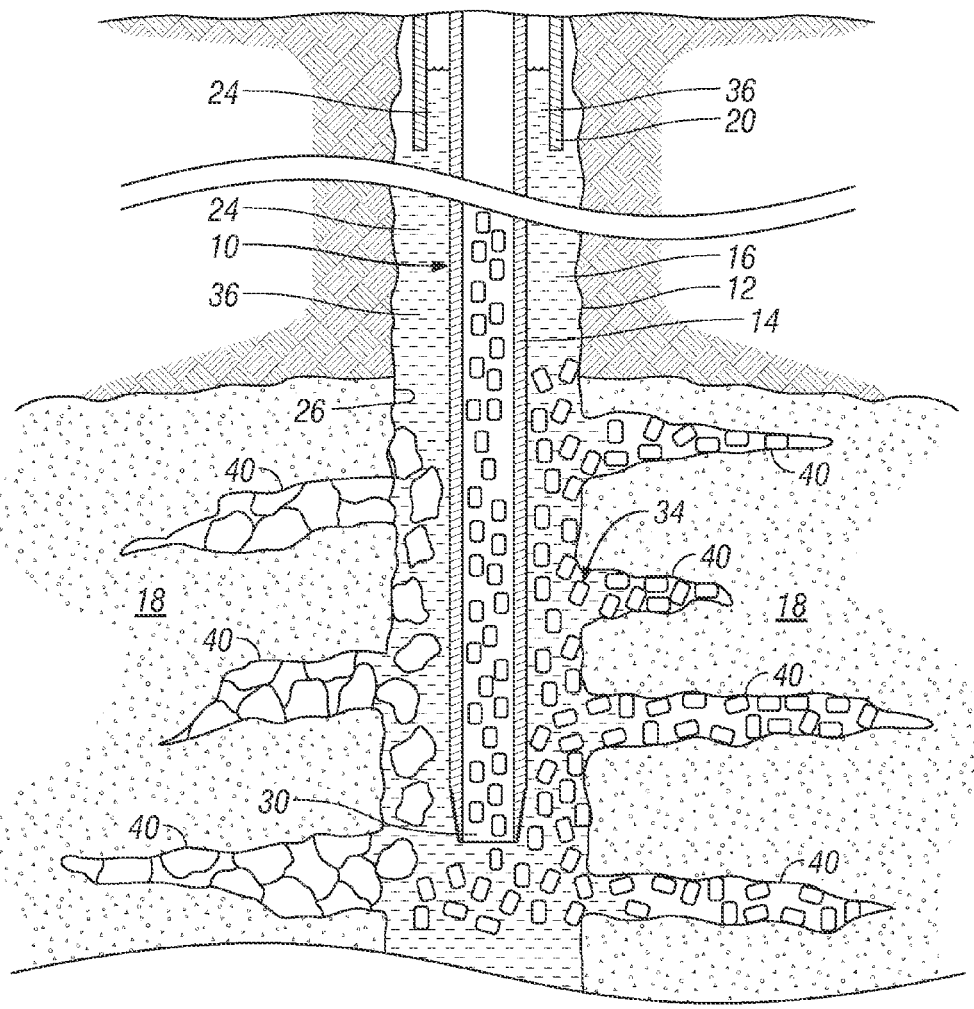
FIG. 1 is a longitudinal sectional view of a section of an oil well that penetrates a formation characterized by several fractures. A load of fluid control pods has been pumped down the drill string and into the formation. Some of the pods (on the right in the drawing) are shown in the unexpanded condition flowing into the voids in the formation, and some of the pods (on the left in the drawing) are shown in the expanded condition substantially filling the voids.

Turning now to the drawings in general and to FIG. 1 in particular, there is shown therein a fluid control system 10 in accordance with the present invention. The system 10 is installed in a well 12. As used herein, "well" refers to any subterranean well, including but not limited to oil, gas and water wells, and including vertical and non-vertical wells. As shown, the system 10 includes an elongate conduit, such as the drill string 14.

In normal drilling operations, the drill string 14 has a bit (not shown) on the end, and rotary action of the bit drills the wellbore 16 through the geologic formations in the earth, such as the target formation 18. The drill string 14 is driven by a rig (not shown) at the well head (not shown). As the wellbore 16 lengthens, sections of casing 20 are installed to stabilize the wall of the wellbore. Since the drill string 14 is already in use at the well site during the drilling phase, the fluid control system 10 conveniently utilizes the drill string 14 as the conduit. However, other tubular conduits may be utilized instead of the drill string 14.

The drill string 14 (or other conduit) should have a diameter small enough to be easily received in the wellbore 16 so as to create an annulus 24 between the outside of the drill pipe and the inside of the casing 20, in the cased sections of the well, or the inside of the wellbore wall 26 in the uncased sections of the well 12. In addition, the length of the drill string 14 should be sufficient to extend from the well head (not shown) to the target formation 18.

With the drill string 14 positioned in the well 12 with the open end 30 near the target formation 18, the drill string can be used to deposit a load of fluid control pods into the well. The pods are designated generally by reference numeral 34. As suggested by the diagrammatic representation of FIG. 1, each treatment pod 34 comprises a discrete mass. "Load," as used herein, refers to a preselected number or amount of pods 34. The number, amount and weight of the pods 34 is selected depending on the conditions present at a particular well site.

With continued reference to FIG. 1, the system 10 further comprises a volume of delivery fluid 36, which is used to pump or push the pods 34 through the drill string 14 and out into the voids 40 in the formation 18. In most instances, water or drilling mud will be a suitable delivery fluid. However, as explained more fully below, the delivery fluid may vary depending on the type of pods 34 used and the depth of the target formation 18.

As indicated, each of the pods 34 comprises a discrete mass. While the size of the pods 34 may vary, the pods are sized to pass through the drill string 14 or other conduit into the target formation 18 with the delivery fluid, such as the water or drilling mud 36. In this way, the pods 34 may be pumped into the formation 18 through the drill string 14 using readily available equipment and techniques well known to those working in the oil field.

Each pod 34 comprises a swelling agent. As used herein, "swelling agent" means a material that absorbs water or well fluids and swells or expands as it absorbs the fluids. As used herein, "well fluids" refers to water or other fluids and includes fluids naturally present in the formation as well as fluids, such as drilling mud, which may be pumped into the formation.

The swelling agent may be a solid mass formed entirely of a unitary piece of the swelling agent material or it may be formed by suspending the swelling agent in a solid matrix of some sort. However, as the most efficient absorption will occur where the swelling agent in the pod has a relatively high surface area, multiple small granules or beads usually will be the most advantageous form.

The swelling agent may be a cross-linked network of hydrophilic polymer with a high capacity for water absorption. This polymer material is in dehydrated, solid form prior to use. In effect, the polymer undergoes a change from that of a dehydrated solid to that of a hydrated gel as it absorbs water. The swelling agent may be naturally occurring or synthetic. It is preferably non-toxic, so that there is no concern that the swelling agent will contaminate any unabsorbed water remaining in the subterranean formation.

The swelling agent preferably is capable of absorbing at least about twice its weight in fluid. More preferably, the swelling agent is capable of absorbing at least about 20 times its weight in fluid, and most preferably is capable of absorbing at least about 100 times its weight in fluid.

In most applications, the preferred swelling agent will be a "superabsorbent," a material commonly used in absorbent products such as horticulture and soil modification products, and in absorbent items, such as diapers and toddler training pants. Superabsorbents typically comprise crosslinked polymers having charged pendant groups. Crosslinking chemicals tie the polymer chains together to form a three dimensional network, enabling the superabsorbent to absorb water or water-based solutions into the spaces in the molecular network, thus forming a gel and locking up the liquid.

Superabsorbents have the ability to absorb and store many times (e.g., 40 to 600 times) their own weight of water. Most superabsorbents retain the liquid that they absorb and typically do not release the liquid, even under pressure. Most preferably, the swelling agent used in the pods 34 is a polyacrylamide superabsorbent, such as Agrosoke brand water-collecting polyacrylamide crystals marketed by Agro Innovators International, Inc. (Arlington Tex.).

Most swelling agents, including the preferred Agrosoke brand superabsorbent crystals, are slippery when wet, that is, producing very low friction between crystals and between crystals and other surfaces. Consequently, when superabsorbent granules are pumped in bulk into an underground formation, the swollen crystals slide very easily against each other and against the surfaces of the earthen formations that form the voids. Thus, the slippery surfaces of these superabsorbent crystals generally facilitate rather than retard or inhibit movement toward the smallest possible crevice, thereby allowing the crystals to "squeeze" into relative tight and narrow voids.

More efficient plugging or filling of the voids usually will be exhibited by pods 34 that have a relatively rough or textured surface, referred to herein as a frictional surface. "Frictional," as used herein, denotes a surface capable of producing more friction between itself and like pods than would be produced between pods formed of bare or untextured swelling agent. This textured or frictional surface will likewise produce greater friction relative to the exposed geological surfaces in the target formation. Thus, a group of pods having frictional surfaces generally control fluid loss using less superabsorbent material than pods with the slimy or slippery surface typical of swelling agents.

Figure 2:
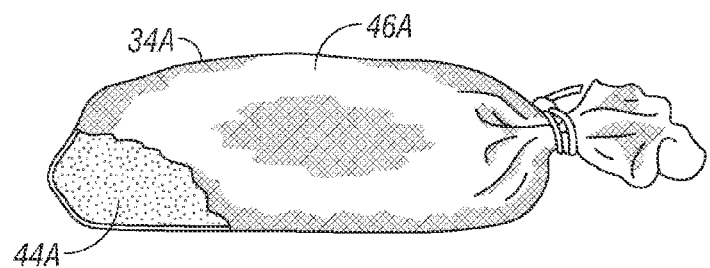
FIGS. 2 and 3 are perspective views of a first preferred embodiment of the fluid control pod made in accordance with the present invention.
Figure 3:
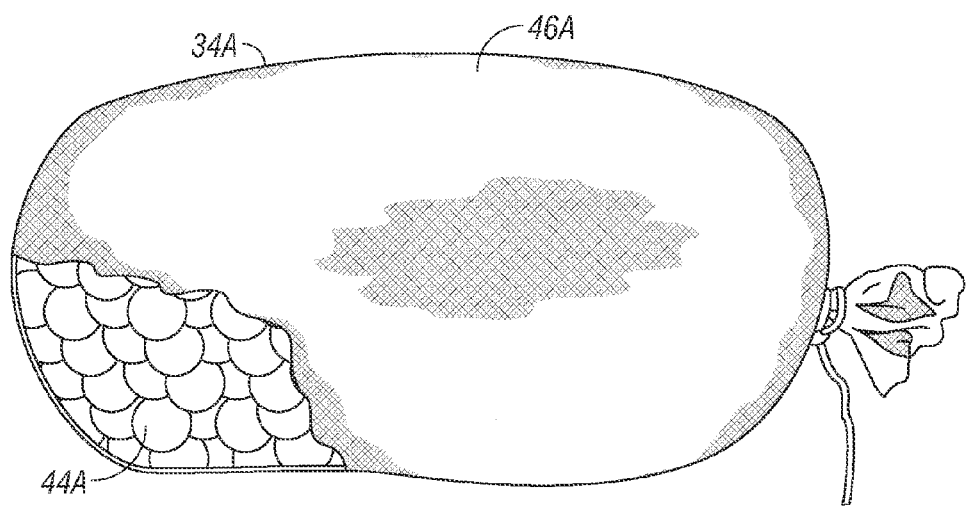

Now it will be apparent that a preferred fluid control pod is formed by placing a selected volume of superabsorbent granules or powder in a fabric bag or sack or other suitable container, and a preferred embodiment of such a pod is the pods 34A shown in FIGS. 2 and 3, to which attention now is directed. The amount of swelling agent or superabsorbent 44A in each sack may vary, but preferably is selected based on the size and elasticity of the sack 46A. The size of the sack 46A or container is selected to allow optimum swelling of the granules 44A inside.

The material selected for the sack 46A should be porous, that is, it should permit the water or well fluids in the formation to pass through and surround the granules 44A contained therein. This will ensure maximum water absorption in each pod. A textile (woven) fabric will provide adequate porosity to permit maximum expansion of the granules, while at the same time producing greater friction on the pod's surface in the formation than would the bare granules.

In addition, the sack material should be elastic so that the sack 46A will stretch easily as the granules 44A expand. Still further, the sack material preferably is flexible so the pod 34A is deformable; this will enable the pod to conform to any shape void. These characteristics facilitate the emplacement of the pods throughout the irregularly shaped voids in the formation, and yet allow the pods to swell efficiently. In particular, the textured frictional surface of the pods provides adhesive friction between adjacent pods and between pods and the surfaces in the formation, thereby reducing the tendency of the swollen pods to become dislodged and leave the void.

Figure 4:
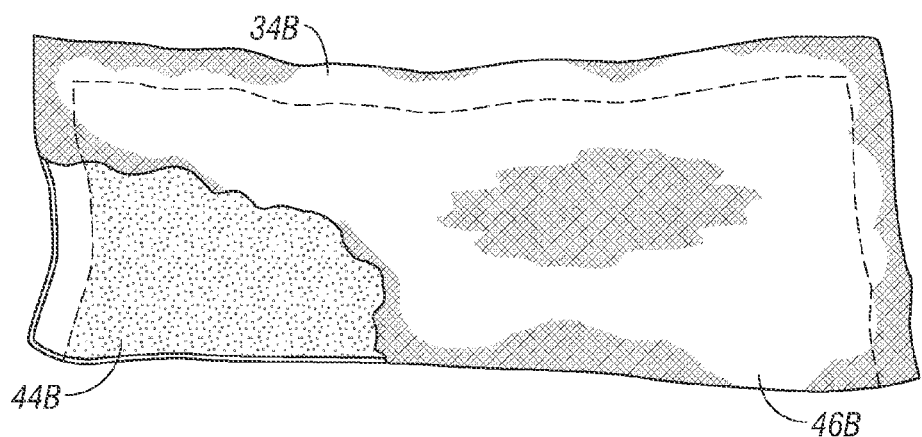
FIGS. 4 and 5 are perspective views of a second preferred embodiment of the fluid control pod made in accordance with the present invention.
Figure 5:
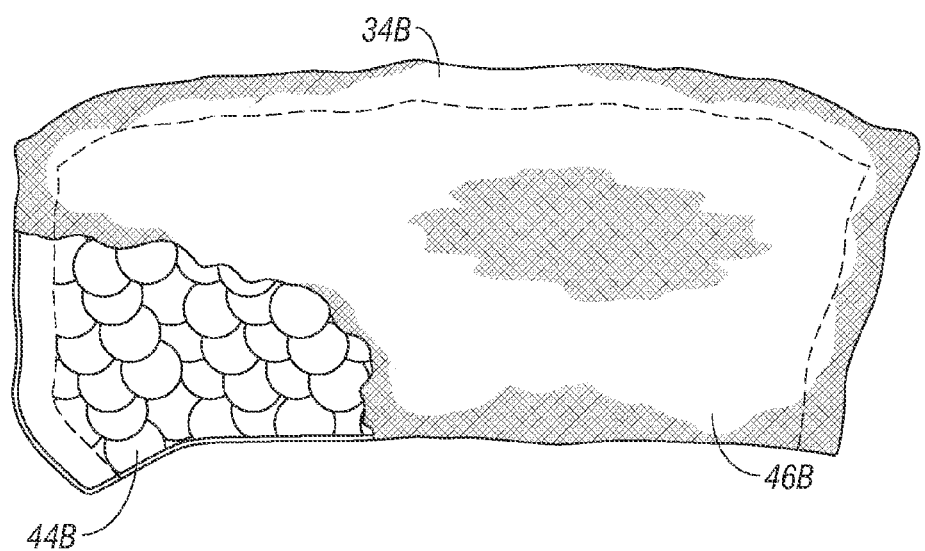

These various attributes are shared by many textiles. One particularly suitable fabric is a stretchable, resilient synthetic or synthetic-blend fabric selected from the group consisting of nylon, polyester, spandex (elastane), and blends thereof. The sack 46A may be formed for tying off the end of a blind tube or pouch of material, as seen in the pod 34A shown in FIGS. 2 and 3. Alternately, as seen in FIGS. 4 and 5, a pouch or envelope 46B may be formed by simply sewing together the edges of sheet of fabric with the superabsorbent granules 44B inside. Other methods of forming a sack or container will be readily apparent.

Having described preferred embodiments of the fluid control pod 34, the method of using the pod 34 and the system 10 now will be explained with continued reference to FIG. 1. First, if a drilling operation is being interrupted, the drill string 14 is withdrawn and the bit is removed. Then, the open-ended drill string 14 is put back down the well 12 until the end 30 is at the level of the target formation 18. Next, the pods 34 are deposited in the well 12.

The pods 34 can be deposited by hand into the well 12 directly into the uphole end (not shown) of the drill string 14 or other conduit. Alternately, the pods 34 can be poured from a barrel or other large vessel (not shown) into the well. In some cases, movement of the pods 34 through the drill sting will be facilitated by pre-wetting the pods with water or with the delivery fluid 36.

After depositing the pods 34 in the well 12, a delivery fluid 36 is used to deliver the pods to the target formation 18. As indicated previously, the delivery fluid 36 is preferably a pumpable fluid, such as drilling mud, and thus the pods 34 can be pumped into the formation 18 in the same manner as the drilling mud alone.

The delivery fluid 36 may be selected to slow the expansion of the swelling agent in the pods 34 until the pods reach the voids 40 in the formation. This may be indicated where the target formation 18 is very deep and the pods will be in the drill string for a relatively long period of time until the formation is reached. In this way, the swelling of the swelling agent is delayed until the pods 34 reach the voids 40 to ensure that they are effectively filled.

After the pods 34 are pumped down to the level of the target formation 18, the end of the drill string 30 is withdrawn to the level of the casing 20 and held there. As the pods 34 move out into the voids 40, they gradually swell as fluid is absorbed. The movement of the pods 34 into the voids is facilitated by the hydrostatic pressure of the fluid column (drilling mud/delivery fluid) in the wellbore 16. The swelling and swollen pods 34 eventually become lodged in the voids 40 and obstruct the flow of water or well liquids from the wellbore 16 out into the formation 18. Depending on the particular swelling agent employed, a standing time of about 5 to 6 hours will be sufficient.

Fluid loss control with the present system may be done preventatively, that is, prior to drilling the well in anticipation of lost circulation problems. Alternately, implementation of this system and method may be reserved and used in response to specific lost circulation and fluid loss events as they occur from time to time during the drilling process. The phrases "controlling fluid loss" and "fluid loss control" refer to efforts to reduce the loss of the fluids into a formation by a measurable amount as compared to losses incurred when the present invention is not employed.

Now it will be appreciated that the present invention provides an improved product, system and method for fluid loss control and lost circulation control in wells. The swelling agent is inexpensive, widely available, non-toxic, and stable for long periods. The fabric sacks provide an inexpensive way of containing small discrete masses of superabsorbent and providing a textured or frictional surface that resists movement between adjacent pods and between the pods and the earthen surfaces in the formation, thus enhancing the tendency of the pods to remain fixed in the voids.

The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present invention have been described in the drawings and accompanying text, the description is illustrative only. Changes may be made in the details, especially in matters of shape, size, and arrangement of the parts within the principles of the invention to the full extent indicated by the broad meaning of the terms of the attached claims. The description and drawings of the specific embodiments herein do not point out what an infringement of this patent would be, but rather provide an example of how to use and make the inventions. The limits of the inventions and the bounds of the patent protection are measured by and defined in the following claims.

What is claimed is:

1. A system for controlling fluid loss in a target formation in an oil or gas well, the well comprising a wellbore extending from a well head at the surface through a target formation, the system comprising:
    a tubular conduit having a diameter small enough to be received in the wellbore and having a length sufficient to extend from the well head to the target formation;
    a volume of delivery fluid; and
    a load of fluid control pods, wherein each pod comprises a discrete mass of swelling agent contained within a container formed of porous, deformable, elastic material, wherein each pod is sized to pass through the conduit into the target formation with the delivery fluid so that the load of pods can be pumped into the formation through the conduit using the delivery fluid, wherein the container material allows the swelling agent to swell but to keep the pod intact in the formation, and wherein the container material has a frictional surface that will frictionally engage surfaces of the formation and surfaces of adjacent pods in the load of pods.

2. The system of claim 1 wherein the mass of swelling agent is formed by granules of swelling agent.

3. The system of claim 2 wherein the swelling agent comprises a superabsorbent composition.

4. The system of claim 3 wherein the superabsorbent comprises polyacrylamide.

5. The system of claim 4 wherein the container is formed of a synthetic or synthetic blend fabric selected from the group consisting of nylon, polyester, spandex (elastane), and blends thereof.

6. The system of claim 2 wherein the container is formed of a synthetic or synthetic blend fabric selected from the group consisting of nylon, polyester, spandex (elastane), and blends thereof.

7. The system of claim 1 wherein the swelling agent is synthetic.

8. The system of claim 1 wherein the swelling agent is a superabsorbent material.

9. The system of claim 8 wherein the swelling agent is synthetic.

10. The system of claim 1 wherein the container is formed of a synthetic or synthetic blend fabric selected from the group consisting of nylon, polyester, spandex (elastane), and blends thereof.

11. The system of claim 1 wherein the delivery fluid is drilling mud or water.

12. The system of claim 1 wherein the conduit is a drill string.

13. The system of claim 1 wherein the delivery fluid is water or drilling mud, wherein the swelling agent comprises superabsorbent granules, and wherein the container comprises a sack made from a synthetic or synthetic blend fabric selected from the group consisting of nylon, polyester, spandex (elastane), and blends thereof.

14. A method for controlling fluid loss in a target formation in an oil or gas well, wherein the well comprises a wellbore extending from a well head at the surface to a target formation, the method comprising:
    depositing a plurality of fluid control pods into the target formation, wherein each pod comprises a discrete mass of swelling agent contained within a container formed of porous, deformable, elastic material that provides the container with a frictional surface so that the pod will swell but remain intact when deposited in the formation causing the frictional surface of the pod container to frictionally engage surfaces of the formation and surfaces of adjacent pods.

15. The method of claim 14 wherein the mass of swelling agent is formed by granules of swelling agent.

16. The method of claim 15 wherein the swelling agent comprises a superabsorbent composition.

17. The method of claim 16 wherein the superabsorbent comprises polyacrylamide.

18. The method of claim 17 wherein the frictional surface of the treatment pod is provided by a container that is formed of a synthetic or synthetic blend fabric selected from the group consisting of nylon, polyester, spandex (elastane), and blends thereof.

19. The method of claim 15 wherein the porous container is formed of a synthetic or synthetic blend fabric selected from the group consisting of nylon, polyester, spandex (elastane), and blends thereof.

20. The method of claim 14 wherein the swelling agent is synthetic.

21. The method of claim 14 wherein the swelling agent is a superabsorbent material.

22. The method of claim 21 wherein the swelling agent is synthetic.

23. The method of claim 14 wherein the porous container is formed of a synthetic or synthetic blend fabric selected from the group consisting of nylon, polyester, spandex (elastane), and blends thereof.

24. The method of claim 14 wherein the depositing step is carried out using drilling mud or water.

25. The method of claim 14 wherein depositing step comprises first depositing the load of fluid control pods in a drill string and then pumping drilling mud or water through the drill string to push the pods into the target formation.

26. The method of claim 14 wherein each of the plurality of pods comprises superabsorbent granules, and wherein the plurality of pods is pumped into the formation using drilling mud and a drill string.

27. A fluid control pod for use in controlling fluid loss in a target formation in a well, the pod comprising a preselected amount of a granular swelling agent within a porous container that is elastic and deformable and has a frictional surface capable of frictionally engaging surfaces of the formation and surfaces of adjacent pods when multiple pods are deposited in the formation and swell in response to fluids in the formation.

28. The fluid control pod of claim 27 wherein the swelling agent comprises a superabsorbent composition.

29. The fluid control pod of claim 28 wherein the superabsorbent comprises polyacrylamide.

30. The fluid control pod of claim 29 wherein the porous container is formed of a synthetic or synthetic blend fabric selected from the group consisting of nylon, polyester, spandex (elastane), and blends thereof.

31. The fluid control pod of claim 27 wherein the porous container is formed of a synthetic or synthetic blend fabric selected from the group consisting of nylon, polyester, spandex (elastane), and blends thereof.

32. The fluid control pod of claim 27 wherein the swelling agent is synthetic.

\* \* \* \* \*